(12) United States Patent
Uno

(10) Patent No.: US 6,926,637 B2
(45) Date of Patent: Aug. 9, 2005

(54) METHOD AND APPARATUS FOR CONTROLLING A BICYCLE TRANSMISSION

(75) Inventor: Kouji Uno, Osaka (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/302,514

(22) Filed: Nov. 21, 2002

(65) Prior Publication Data

US 2003/0096674 A1 May 22, 2003

(30) Foreign Application Priority Data

Nov. 21, 2001 (JP) ........................................ 2001-355868

(51) Int. Cl.[7] ............................ B60K 1/02; F16H 59/00
(52) U.S. Cl. ............................................. 477/3; 474/70
(58) Field of Search ........................ 474/70, 78; 477/3, 477/115, 90, 91; 180/65.2–65.3, 338

(56) References Cited

U.S. PATENT DOCUMENTS

| | | | | |
|---|---|---|---|---|
| 4,605,240 A | * | 8/1986 | Clem et al. ................ | 474/70 |
| 5,261,858 A | * | 11/1993 | Browning .................. | 474/78 |
| 5,599,244 A | * | 2/1997 | Ethington .................. | 474/70 |
| 6,073,061 A | | 6/2000 | Kimura | |
| 6,146,297 A | * | 11/2000 | Kimura ...................... | 474/78 |
| 6,367,833 B1 | * | 4/2002 | Horiuchi .................... | 474/69 |
| 2002/0094906 A1 | * | 7/2002 | Jordan ....................... | 475/254 |

FOREIGN PATENT DOCUMENTS

| | | | | |
|---|---|---|---|---|
| JP | 360076668 A | * | 5/1985 | |
| JP | 10-159964 A | | 6/1988 | |
| JP | 8-113181 | | 5/1996 | |
| JP | 408337192 A | * | 12/1996 | |
| JP | 10-147279 | | 6/1998 | |
| JP | 02001039380 A | * | 2/2001 | |

* cited by examiner

Primary Examiner—Roger Pang
(74) Attorney, Agent, or Firm—James A. Deland

(57) ABSTRACT

A control device is provided for a bicycle having a transmission with a plurality of speed steps, wherein the control device includes a traveling condition signal receiver that receives traveling condition signals corresponding to a traveling condition value of the bicycle, a threshold value memory that stores a first threshold value of the traveling condition, and a processor that compares a plurality of the traveling condition values to the first threshold value and provides a first control signal for shifting the bicycle transmission when the plurality of traveling condition values pass the first threshold value.

21 Claims, 14 Drawing Sheets

| GEAR SPEED | UPSHIFT THRESHOLD (U) (km/h) | | FIRST DOWNSHIFT THRESHOLD (D1) (km/h) | | SECOND DOWNSHIFT THRESHOLD (D2) (km/h) | |
|---|---|---|---|---|---|---|
| 1 | 12 | U (1) | 0 | D1 (1) | 0 | D2 (1) |
| 2 | 16.4 | U (2) | 10.7 | D1 (2) | 7.6 | D2 (2) |
| 3 | 255 | U (3) | 14.6 | D1 (3) | 10.3 | D2 (3) |

Fig. 4

| | CRANK ROTATION (rpm) | JUDGMENT NUMBER | JUDGMENT TIME | PULSE PERIOD (sec) |
|---|---|---|---|---|
| D1 (3) | 42.5 | 20 | 0.72 | 0.71 |
| D2 (3) | 30 | 1 | 0.05 | 1 |
| D1 (2) | 42.5 | 15 | 0.74 | 0.71 |
| D2 (2) | 30 | 1 | 0.07 | 1 |

Fig. 5

| GEAR SPEED | UPSHIFT THRESHOLD (U) (rpm) | | FIRST DOWNSHIFT THRESHOLD (D1) (rpm) | | SECOND DOWNSHIFT THRESHOLD (D2) (rpm) | |
|---|---|---|---|---|---|---|
| 1 | 65 | U (1) | 0 | D1 (1) | 0 | D2 (1) |
| 2 | 65 | U (2) | 40 | D1 (2) | 30 | D2 (2) |
| 3 | 700 | U (3) | 40 | D1 (3) | 30 | D2 (3) |

Fig. 11

| GEAR SPEED | FIRST UPSHIFT THRESHOLD (U1) (km/h) | | SECOND UPSHIFT THRESHOLD (U2) (km/h) | | FIRST DOWNSHIFT THRESHOLD (D1) (km/h) | | SECOND DOWNSHIFT THRESHOLD (D2) (km/h) | |
|---|---|---|---|---|---|---|---|---|
| 1 | 11.1 | U1 (1) | 13.9 | U2 (1) | 0 | D1 (1) | 0 | D2 (1) |
| 2 | 15.1 | U1 (2) | 18.9 | U2 (2) | 10.7 | D1 (2) | 7.6 | D2 (2) |
| 3 | 255 | U1 (3) | 255 | U2 (3) | 14.6 | D1 (3) | 10.3 | D2 (3) |

Fig. 12

|  | CRANK ROTATION (rpm) | JUDGMENT NUMBER | JUDGMENT TIME | PULSE PERIOD (sec) |
|---|---|---|---|---|
| D1 (3) | 42.5 | 20 | 0.72 | 0.71 |
| D2 (3) | 30 | 1 | 0.05 | 1 |
| D1 (2) | 42.5 | 15 | 0.74 | 0.71 |
| D2 (2) | 30 | 1 | 0.07 | 1 |
| U1 (2) | 60 | 15 | 0.52 | 0.50 |
| U2 (2) | 75 | 1 | 0.03 | 0.40 |
| U1 (1) | 60 | 11 | 0.52 | 0.50 |
| U2 (2) | 75 | 1 | 0.04 | 0.04 |

Fig. 13

METHOD AND APPARATUS FOR CONTROLLING A BICYCLE TRANSMISSION

BACKGROUND OF THE INVENTION

The present invention is directed to bicycles and, more particularly, to various features of an apparatus for controlling a bicycle transmission.

Bicycle transmissions usually comprise either internally mounted transmissions or externally mounted transmissions. Internally mounted transmissions usually are built into the hub of the rear wheel, and externally mounted transmissions usually have a derailleur for switching a chain among a plurality of sprockets. A shift control device mounted to the bicycle frame and connected to the transmission by a shift control cable usually controls both types of transmissions.

The shift control device frequently comprises a shift lever mounted to the handlebars, and in many cases the shift lever is positioned close to the brake lever. The shifting operation is difficult when decelerating because it becomes necessary to operate the brake lever and the shift lever at the same time. For this reason, automatic shift control devices have been developed that automatically shifts gears (speed steps) in response to the bicycle's traveling conditions (e.g., wheel speed or crank revolutions).

Conventionally, bicycle wheel speed has been detected using a magnet mounted on the bicycle wheel and a reed switch mounted to the bicycle frame. The reed switch produces one pulse per wheel revolution, and the wheel speed may be determined from the interval between detected pulses and the wheel diameter. The automatic shift control device sets an upshift threshold value and a downshift threshold value for each speed step. The bicycle transmission upshifts to the next higher speed step when the detected speed exceeds the upshift threshold value. If the detected wheel speed subsequently falls below the downshift value, then the bicycle transmission downshifts back to the original speed step. Sometimes the upshift threshold value for a particular speed step is set to a slightly higher value than the downshift threshold value of the next higher speed step to create a well known hysteresis effect that minimizes chatter from frequent gear shifting when the wheel speed hovers around the shift points.

Chattering is prevented easily with the above technique when wheel speed is detected at relatively low frequencies such as one pulse per wheel revolution, since shift timing is controlled according to the different speeds set for upshifting and downshifting. But if, for example, attaching several magnets circumferentially around the bicycle wheel increases the wheel speed detection frequency per revolution, meaningless gear shifting may occur frequently. More specifically, if the bicycle speed drops even momentarily due to obstacles such as small bumps or stones on the road surface, the bicycle transmission would downshift against the rider's intent. Thereafter, when the bicycle speed returns to normal, the bicycle transmission would upshift back to the original gear. When such shifting actions occur repetitively, the pedal force required to maintain the desired speed changes frequently, thus causing the rider to pedal in an uncoordinated manner and reducing the stability of the ride.

SUMMARY OF THE INVENTION

The present invention is directed to features of an automatic bicycle transmission that contribute to a reduction of some undesirable characteristics of known bicycle transmissions. In one embodiment of the present invention, a control device is provided for a bicycle having a transmission with a plurality of speed steps, wherein the control device includes a traveling condition signal receiver that receives traveling condition signals corresponding to a traveling condition value of the bicycle, a threshold value memory that stores a first threshold value of the traveling condition, and a processor that compares a plurality of the traveling condition values to the first threshold value and provides a first control signal for shifting the bicycle transmission when the plurality of traveling condition values pass the first threshold value. Additional inventive features will become apparent from the description below, and such features may be combined with the above features to provide additional benefits.

BRIEF DESCRIPTION OF THE DRAWINGS

FIG. 4 is a table showing a particular embodiment of upshift and downshift threshold values;

FIG. 5 is a table showing a particular embodiment of relationships between threshold values and judgment timing;

FIG. 11 is a table showing a particular embodiment of upshift and downshift threshold values in this embodiment;

FIG. 12 is a table showing another embodiment of upshift and downshift threshold values;

FIG. 13 is a table showing a particular embodiment of relationships between threshold values and judgment timing;

DETAILED DESCRIPTION OF THE EMBODIMENTS

Figure 1:
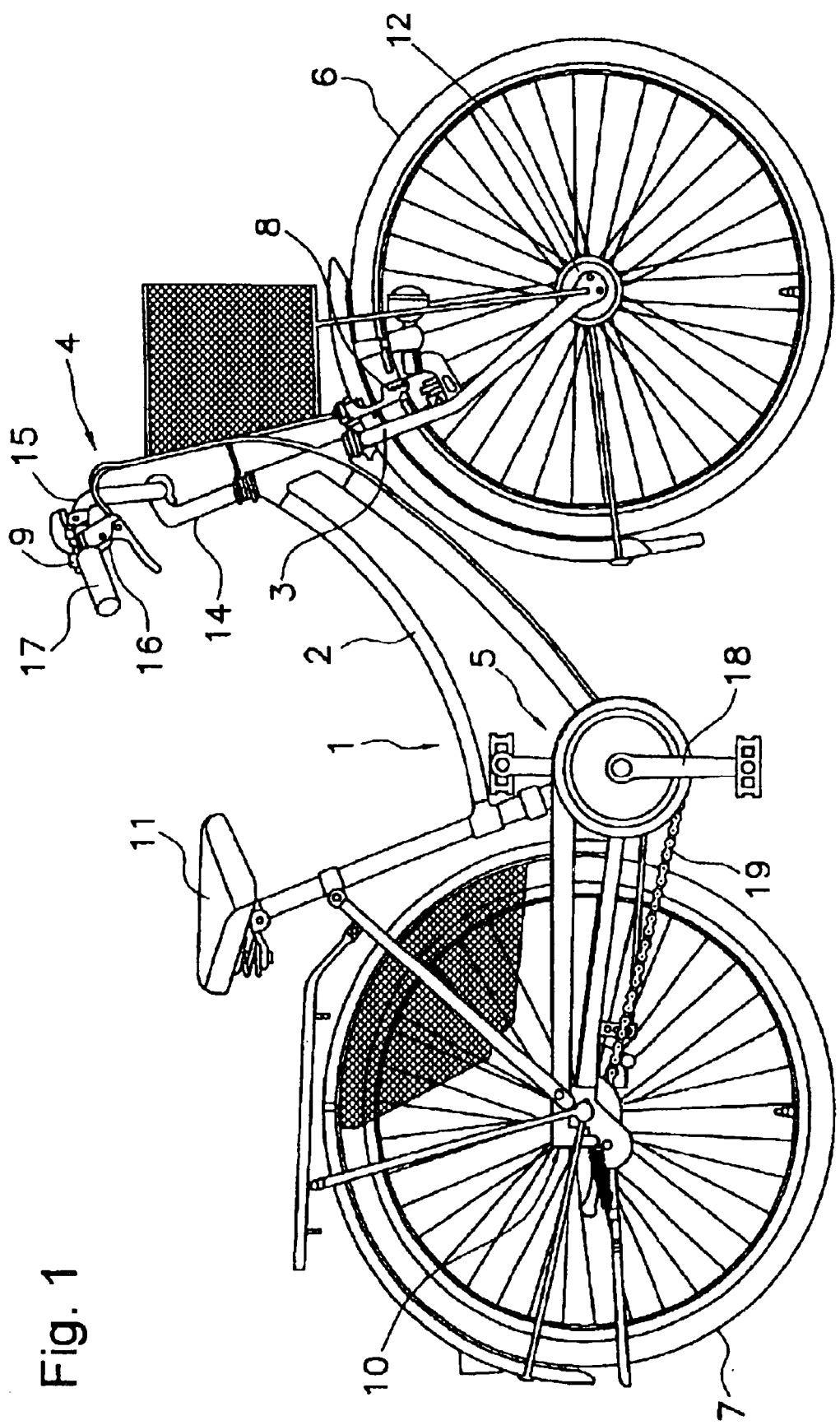
FIG. 1 is a side view of a bicycle that includes an embodiment of an automatically controlled bicycle transmission.

FIG. 1 is a side view of a bicycle that includes a particular embodiment of an automatically controlled bicycle transmission. The bicycle comprises a frame 1 having a double-loop-shaped frame body 2, a saddle 11, a front fork 3, a handlebar part 4, a driving part 5, a front wheel 6 in which is installed a generator hub 12, a rear wheel 7 in which is installed an internal gear changing hub 10, and front and rear brake devices 8 (only the front brake device is shown in the drawing). The handlebar part 4 has a handlebar stem 14, which is fixed to an upper part of the front fork 3, and a handlebar 15 fixed to the handlebar stem 14. Brake levers 16 and grips 17 are installed on the two ends of the handlebar 15. Brake levers 16 operate the brake devices 8.

Figure 2:
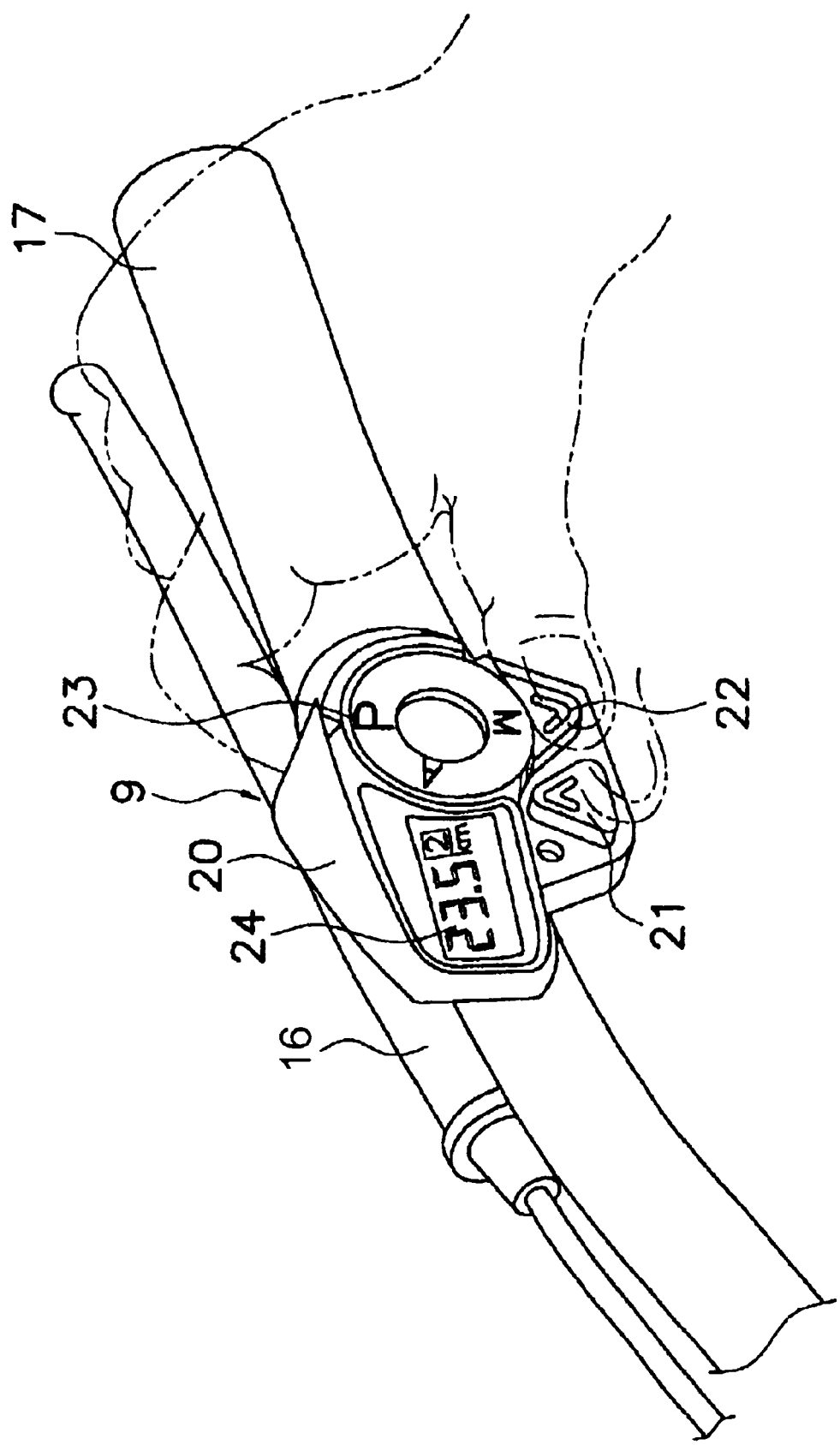
FIG. 2 is a detailed view of a particular embodiment of a handlebar mounted component of the bicycle transmission.

A shift operation unit 9 is mounted on the right-side brake lever 16. As shown in FIG. 2, the shift operation unit 9 has a control housing 20 formed integrally with the right-side (front-wheel) brake lever 16, two control buttons 21 and 22 disposed next to each other to the left and right on the lower portion of the control housing 20, a control dial 23 disposed above the control buttons 21 and 22, and a liquid-crystal display component 24 disposed to the left of the control dial 23.

The control buttons 21 and 22 are triangular push buttons. The control button 21 on the left side is a button for performing shifts to a higher speed step from a lower speed step (upshifts), while the control button 22 on the right side is a button for performing shifts to a lower speed step from a higher speed step (downshifts). The control dial 23 is used for switching among two shifting modes and a parking mode (P), and it has three stationary positions: P, A, and M. The shifting modes comprise an automatic shift mode (A) and a manual shift mode (M). The parking mode (P) is for locking the internal gear changing hub 10 and controlling the rotation of the rear wheel 7. The automatic shift mode (A) is for automatically shifting the internal gear changing hub 10 by means of a bicycle speed signal from the generator hub 12. The manual shift mode (M) is for shifting the internal gear changing hub 10 through the operation of the control buttons 21 and 22. The current riding speed is displayed on the liquid-crystal display component 24, as is the current speed step selected at the time of the shift.

Figure 3:
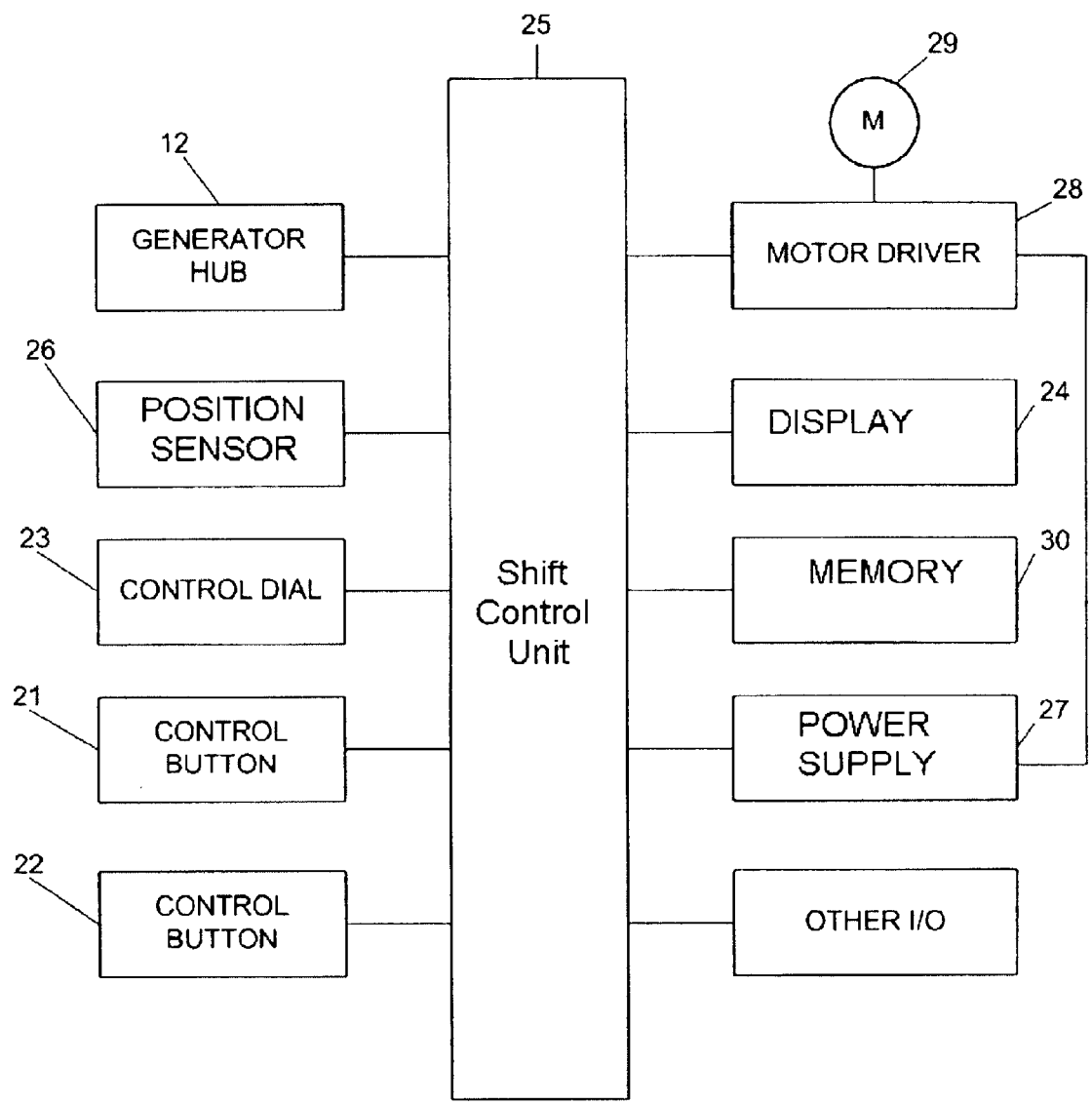
FIG. 3 is a block diagram of a particular embodiment of a shift control device.

A shift control unit 25 (FIG. 3) for controlling shifting operations is housed inside the control panel 20. In general, the shift control unit 25 comprises a microcomputer consisting of a CPU, a RAM, a ROM, and an I/O interface. As shown in FIG. 3, the shift control unit 25 is connected to the generator hub 12, to an actuation position sensor 26 such as a potentiometer that senses the actuation position of the internal gear changing hub 10, to the control dial 23, and to the control buttons 21 and 22. The shift control unit 25 also is connected to a power supply 27 (for example, a battery), to a motor driver 28 for driving a variable-speed motor 29 that operates the internal gear changing hub 10, to the liquid-crystal display component 24, to a memory component 30, and to other input/output components. The memory component 30 may be an EEPROM or another type of rewritable nonvolatile memory. Various types of data, such as passwords used during parking mode, tire diameter used for speed detection or the like, are stored in the memory component 30. Also stored in memory component 30 are data expressing respective relations between each speed step and the shifting speeds during the automatic mode. The shift control unit 25 controls the motor 29 according to the various modes, and it also controls the display of the liquid-crystal display component 24.

The generator hub 12 is, for example, a 28-pole AC generator that generates an alternating current signal in response to wheel speed (i.e., 14 cycles per wheel revolution). The shift control unit 25 detects the bicycle speed S from the AC signals sent from generator hub 12. Thus, wheel speed S can be detected 14 times per revolution, which results in much greater resolution that wheel speed detected using conventional magnets and reed switches. This permits real-time execution of shift control.

The drive unit 5 comprises a gear crank 18 rotatably supported by the frame body 2, a chain 19 driven by the crank 18, and the internal gear changing hub 10. The internal gear changing hub 10 is a three-speed hub having three speed step positions and a lock position, and it is switched by shift motor 29 to the three speed step positions and to the lock position, for a total of four positions. As noted above, the lock position restricts the revolution of internal gear changing hub 10. In this embodiment, the gear ratios of internal gear changing hub 10 are 0.733, 1 and 1.360.

FIG. 4 is a table showing a particular embodiment of upshift and downshift threshold values used when the bicycle is operating in automatic mode. In this embodiment, the downshift threshold value is divided into two thresholds, a first downshift threshold D1 and a second downshift threshold D2. In general, when a downshift is to be performed at the first downshift threshold D1, the downshift is performed only when the traveling condition has initially passed the downshift threshold D1, and one or all of a plurality of subsequent detections of the traveling condition also have passed the downshift threshold D1. On the other hand, when the detected traveling condition passes the second downshift threshold D2, a downshift is performed immediately, regardless of any prior detected traveling condition. For example, if the thresholds are given in terms of bicycle speed as shown in FIG. 4, then the downshift is performed only when the bicycle speed has initially fallen below the downshift threshold D1, and one or all of a plurality of subsequently detected bicycle speeds also have fallen below the downshift threshold D1. When the detected bicycle speed falls below the second downshift threshold D2, a downshift is performed immediately, regardless of any prior detected speeds.

In this embodiment, the upshift and downshift thresholds for each gear or speed step are derived using the crank rotation speed as a reference. For example, the upshift threshold U is set at a crank rotation speed of 65 rpm, whereas the first downshift threshold D1 is set at a crank rotation speed of 42.5 rpm and the second downshift threshold D2 is set at a crank rotation speed of 30 rpm. The upshift threshold for the first speed step U(1) is 12 km/h, for example, and the upshift threshold for the second speed step U(2) is 16.4 km/h, for example. For the third speed step, the first downshift threshold D1(3) is 14.6 km/h, for example, and the second downshift threshold D2(3) is 10.3 km/h, for example. For the second speed step, the first downshift threshold D1(2) is 10.7 km/h, for example, and the second downshift threshold D2(2) is 7.6 km/h, for example.

An additional feature of this embodiment is that it may be desirable to determine whether or not the detected speed has fallen below the first threshold for a prescribed time period to further guard against spurious operation. For example, it could be ascertained whether or not the detected speed falls below the first downshift threshold D1 for at least a period of one half of one rotation of the crank 18. By making the judgment time longer than one half of one rotation of crank 18, gear shift control can be performed with consideration of the pulses caused by the speed variations of the crank 18. Thus, the pulses produced during one half of one rotation of the crank 18 have less of an effect on the shifting characteristics.

The periods of the crank rotation speed used in the setting of the first downshift threshold D1 in this embodiment, and the judgment times set in consideration thereof, are shown in FIG. 5. Here, in the case of the first downshift threshold D1, 42.5 rpm is set as the reference, and since the period is the reciprocal of the rotation speed, the period of one half of one rotation of the crank 18 is 0.71 seconds. In the case of the second downshift threshold D2, the period is 1 second. When the gear ratios of the first, second and third speeds of the internal gear changing hub 10 are set to 0.733, 1, and 1.360 respectively, and the numbers of teeth on a front sprocket (not shown) which is attached to the crank 18 and a rear sprocket (not shown) which is attached to the rear wheel 7 are set to 33 and 16 respectively, the speed increasing ratios of the crank rotation speed and the wheel rotation speed become 1.51, 2.06, and 2.81 in first speed, second speed and third speed respectively. Accordingly, since bicycle speed signals S are output from the generator hub 12 fourteen times per one rotation of the front wheel 6, judgments as to whether or not a downshift will be performed according to the consecutive detection results of the bicycle speed S may be made 20 times when in third speed and 15 times when in second speed in order to exceed one half of one rotation of the crank 18. Since the minimum judgment time must exceed the pulse period, and if the bicycle is traveling at a speed near the first downshift threshold D1, this minimum judgment time is 0.72 seconds in third speed and 0.74 seconds in second speed.

Figure 6:
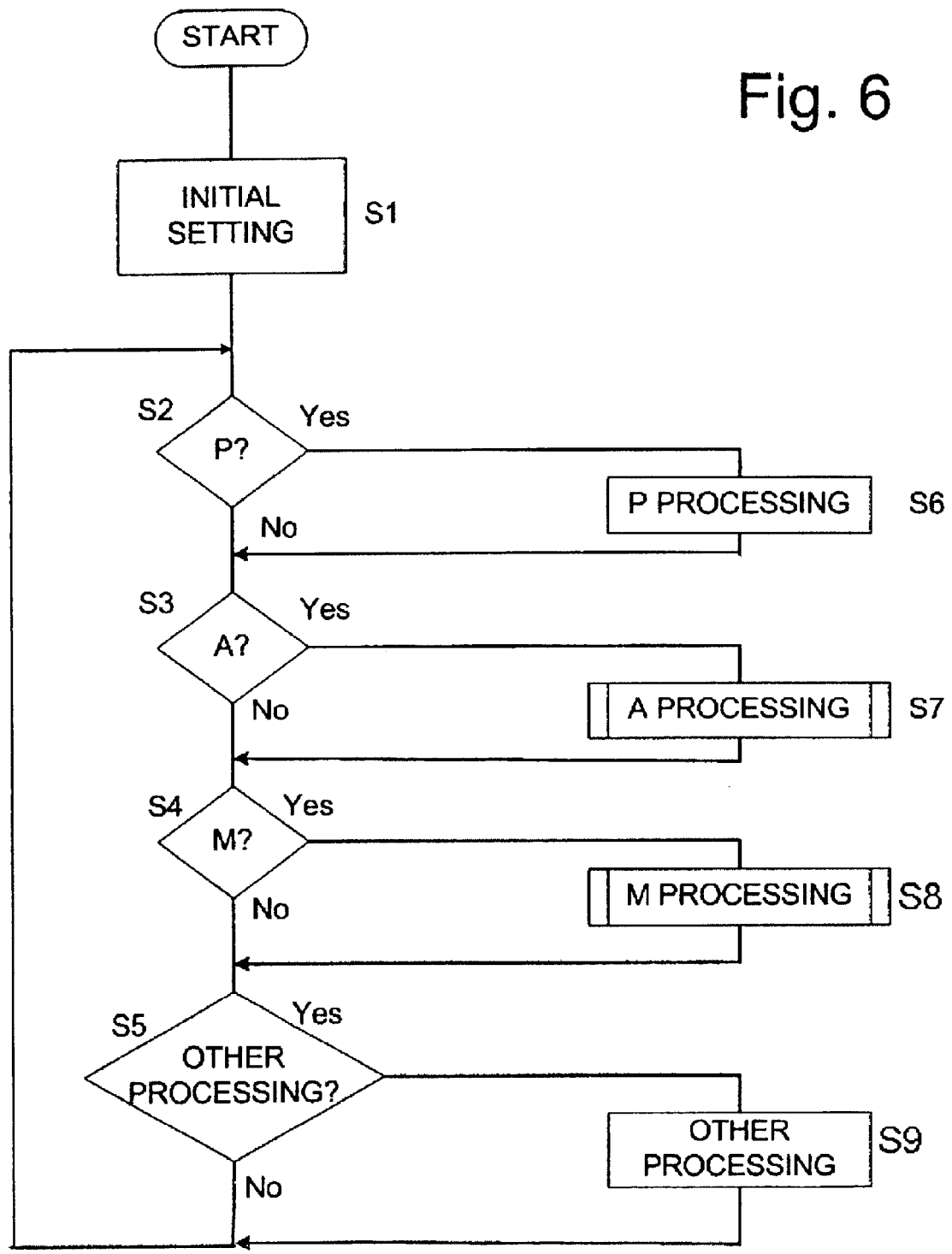
FIG. 6 is a flowchart of a particular embodiment of an algorithm for operating the bicycle transmission.
Figure 7:
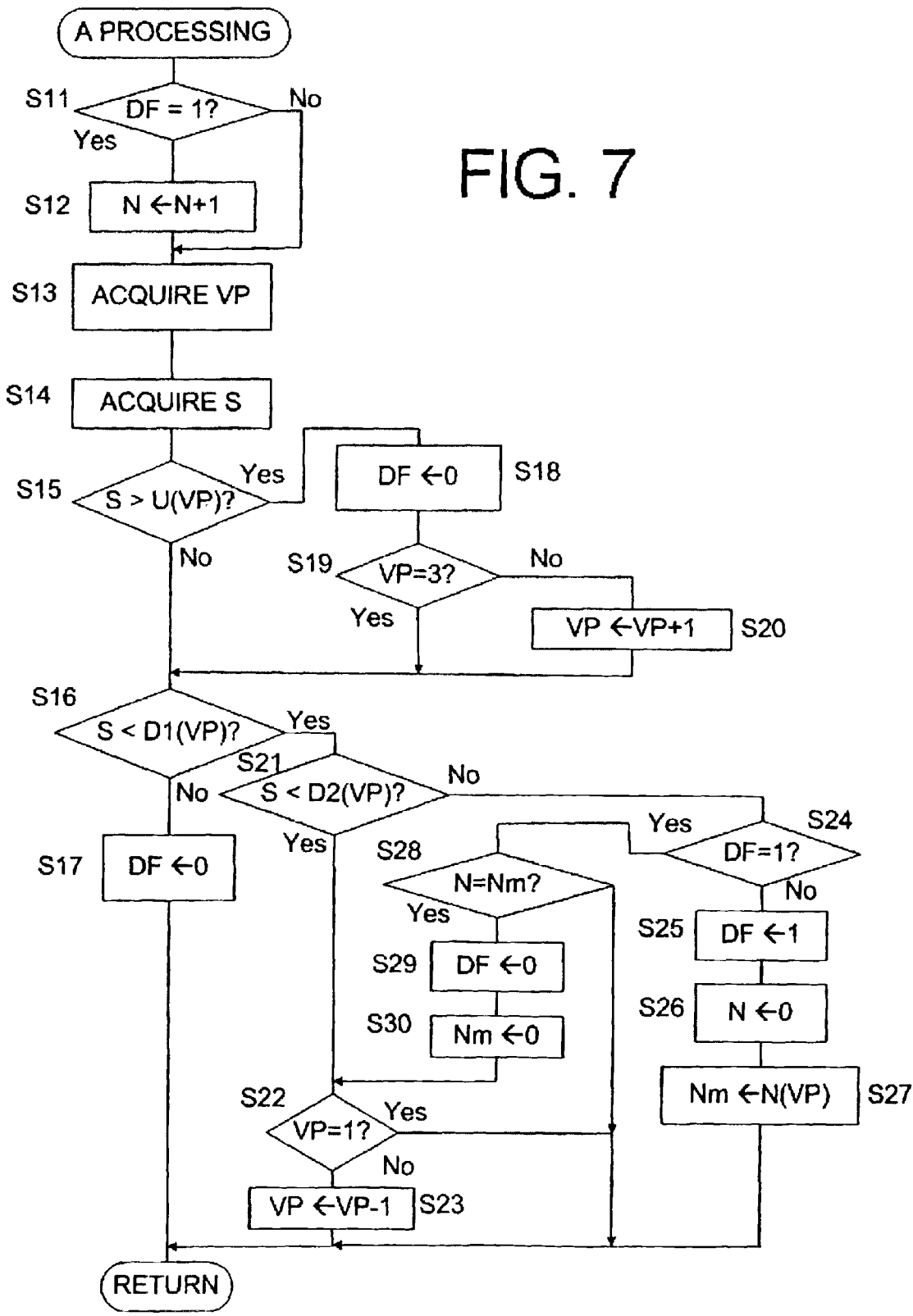
FIG. 7 is a flowchart of a particular embodiment of an algorithm for automatically operating the bicycle transmission.
Figure 8:
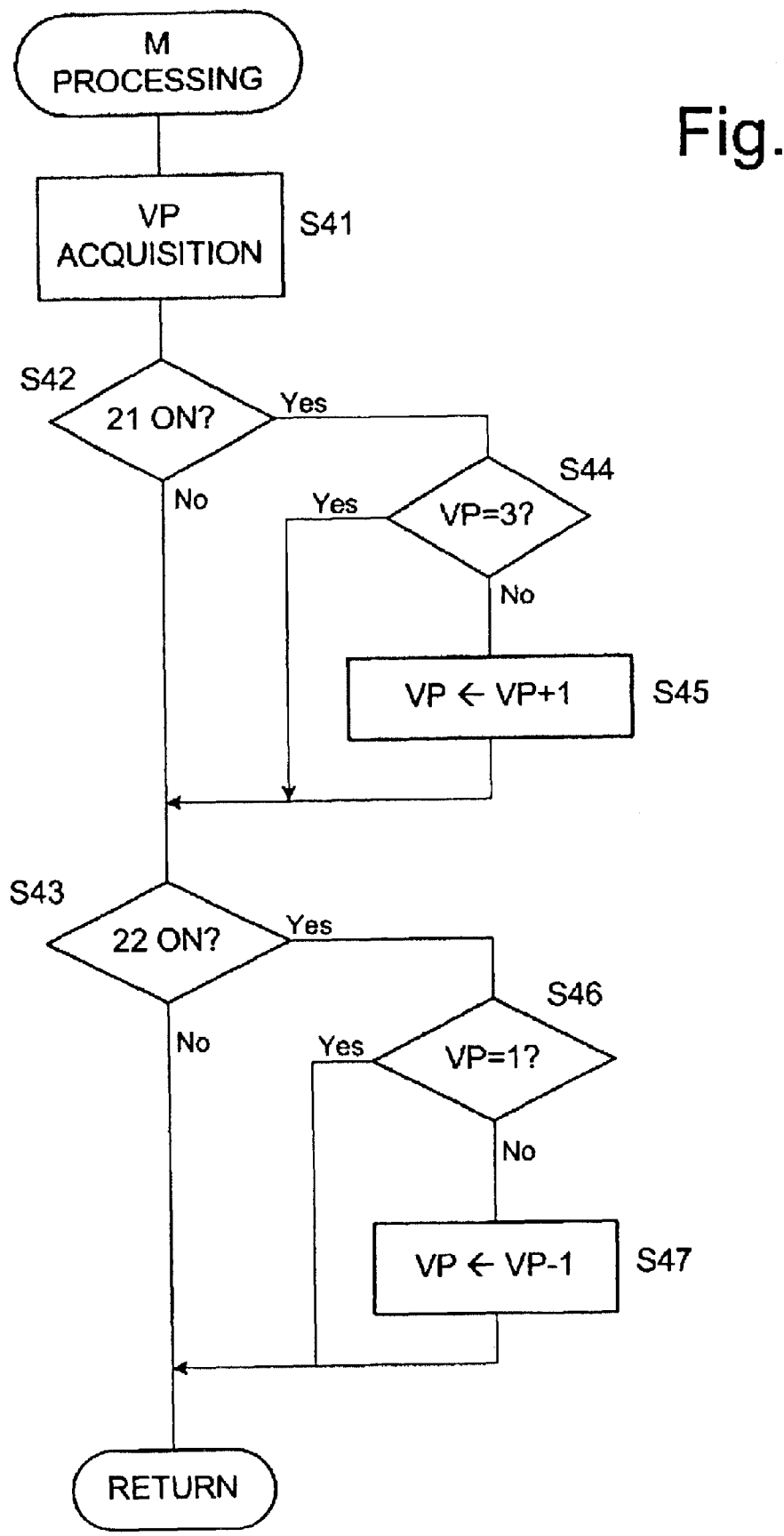
FIG. 8 is a flowchart of a particular embodiment of an algorithm for manually operating the bicycle transmission.

The bicycle transmission is operated (including locking) using operating dial 23 and, in the case of the manual mode of operation, operating buttons 21 and 22. FIGS. 6–8 are flowcharts showing a particular embodiment of an algorithm for the operation of shift control unit 25. As shown in FIG. 6, when the power is turned on (start), initialization occurs in step S1. Here, various operating parameters may be set (e.g., that a 26-inch diameter wheel is installed on the bicycle), the current speed step VP is read and set (e.g., to the second speed VP=2) from position sensor 26, and various flags are set. In step S2, a decision is made whether or not control dial 23 is set to the parking mode (P). In step S3, a decision is made whether or not control dial 23 is set to the automatic shift mode (A). In step S4, a decision is made whether or not control dial 23 is set to the manual shift mode (M). In step S5, a decision is made whether to select some other process, such as inputting tire diameter, for example.

When the control dial 23 has been turned to the (P) position and set to the parking mode (P), then the process moves from step S2 to step S6. In step S6, the parking process (P) is executed. In this process, various routines are executed by operating buttons 21, 22. Such routines may include a password registration routine for registering a password that will clear the locked status of internal gear changing hub 10, or a password input process for inputting and referencing the password for clearing the locked status, and so on. When the control dial 23 has been turned to the (A) position and set to the automatic shift mode (A), then the process moves from Step S3 to step S7 to execute the automatic shift process (A) shown in FIG. 7. If the control dial 23 is turned to the (M) position and set to the manual shift mode (M), then the process moves from step S4 to step S8 to execute the manual shift process (M) shown in FIG. 8. If other processes are selected, the process moves from step S5 to step S9, and the selected process is executed.

FIG. 7 is a flowchart of a particular embodiment of an algorithm for the automatic shift process (A) of step S7. In the automatic shift process of step S7, the operating position VP is set to the appropriate speed step which corresponds to the bicycle speed S. Initially, it is ascertained whether or not a determining flag DF is set or not (DF=1) in a step S7. This determining flag DF is set in a step S25 described hereinbelow the first time the bicycle speed is detected to be below the first downshift threshold value D1, and it is used in order to determine whether or not a number of detection results corresponding to one half of one rotation of the crank 18 have elapsed at the time of a downshift in accordance with the first downshift threshold D1. If the determining flag DF is already set, processing moves to step S12, wherein a counting variable N showing the number of speed detections is increased by one. The count N also is used to determine whether or not a number of detection results corresponding to one half of one rotation of the crank 18 have elapsed at the time of a downshift in accordance with the first downshift threshold D1. If the determining flag DF is not set, then step S12 is skipped.

In step S13, the operating position VP of the operating position sensor 26 (indicating the current speed step) is acquired, and in step S14, the current bicycle speed S according to the speed signals from the generator hub 12 is acquired. In step S15, a judgment is made whether or not the current bicycle speed S exceeds the upshift threshold U (VP) for the current speed step shown in FIG. 4. In step S16, a judgment is made whether or not the current bicycle speed S has fallen below the first downshift threshold D1 (VP) shown in FIG. 4. If the detected bicycle speed S is higher than the first downshift threshold D1 (VP) and lower than the upshift threshold U (VP), then processing moves from step S16 to step S17, wherein the determining flag DF is reset in order to cancel any previous downshift judgment made from the first downshift threshold D1 (VP), and processing returns to the main routine.

If it was determined in step S15 that the current bicycle speed S exceeds the upshift threshold U (VP) for the current speed step (e.g., if the bicycle speed S is faster than 16.4 km/h when in second gear (VP–2)), then processing moves to step S18. In step S18, the determining flag DF is reset in order to cancel any downshift judgment made from the first downshift threshold D1 (VP). In step S19, a judgment is made whether or not the bicycle transmission is in third gear. When the bicycle transmission is in third gear, no further upshifts can be made, so the process moves to step S16 without further upshift processing. Note that the upshift threshold in third speed is 255 km/h, a speed which is inconceivable under normal circumstances, and therefore this routine would not normally be performed in third gear. When the bicycle transmission is below third gear, then the process moves to step S20, wherein the operating position VP is incremented by one in order to shift up one speed step, after which processing moves to step S16. At approximately the same time, motor 29 is operated so that the internal gear shifting hub 10 shifts up one gear.

If it is determined in step S16 that the current bicycle speed S is below the first downshift threshold D1 (VP) for the current speed step (e.g., if the bicycle speed S falls below 10.7 km/h when in second gear (VP=2)), then the process moves from step S16 to step S21. In step S21, a judgment is made whether or not the current bicycle speed S has fallen below the second downshift threshold D2 (VP) for the current speed step. In this embodiment, if the detected bicycle speed S falls below the second downshift threshold D2 (VP), a downshift is performed immediately, regardless of any prior detection results. Thus, when the speed drops due to rider fatigue or an ascent of a steep slope, a downshift is performed quickly such that the load on the rider can be lightened. Hence, if it ascertained in step S21 that the detected bicycle speed S falls below the second downshift threshold D2 (VP), the process moves to step S22, and a judgment is made whether or not the bicycle transmission is in first gear. If the bicycle transmission is in first gear, then there is no lower gear, so no further downshift processing is performed and the process returns to the main routine. When the bicycle transmission is in second gear or above, the process moves to step S23, wherein the operating position VP is decreased by one in order to shift down one speed step, after which the process returns to the main routine. At approximately the same time, motor 29 is operated so that the internal gear changing hub 10 shifts down one gear.

If it is determined in Step S21 that the detected bicycle speed S is faster than the second downshift threshold D2 (VP), then the process moves from step S21 to step S24. In step S24, a judgment is made whether or not the determining flag DF is already set. This judgment is made to determine whether or not this is the first time that the bicycle speed is slower than the first downshift threshold D1(VP) and above the second downshift threshold. If the determining flag DF is not yet set (thus indicating that this time is the first such detection), then the determining flag is set in step S25, the counting variable N is set to 0 in Step 26, and a maximum count number Nm is set to the number of judgments N (VP) for the current speed step as shown in FIG. 5. A judgment already has been made in step S16, so Nm is actually loaded with the number of judgments shown in FIG. 5 minus one, for example 19 in third gear and 14 in second gear.

If it is determined that the determining flag DF is set (i.e., if the detected bicycle speed S already has been detected at least once to be lower than the first downshift threshold D1(VP) and faster than the second downshift threshold D2(VP)), then the process moves from step S24 to step S28. In step S28, a judgment is made whether or not the count number N has reached the maximum count number Nm (i.e., whether or not the bicycle speed S has been detected to be slower than the first downshift threshold D1 (VP) and higher than the second downshift threshold D2 (VP) Nm number of times, which corresponds to one half of one rotation of the crank). If the count number N has not yet reached the maximum count number Nm, then the process returns to the main routine. If it is determined in step S28 that the count number N has reached the maximum count number Nm, then the determining flag DF is reset in step S29, the maximum count number Nm is set to zero in step S30, and the process moves to step S22. As noted above, in Step S22 a judgment is made whether or not the bicycle transmission is in first gear. If the bicycle transmission is in first gear, then there is no lower gear, so no further downshift processing is performed, and the process returns to the main routine. When the bicycle transmission is in second gear or above, processing moves to step S23, wherein the operating position VP is decreased by one in order to shift down one speed step, after which the process returns to the main routine. At approximately the same time, motor 29 is operated so that the internal gear changing hub 10 shifts down one gear.

In conclusion, when the detected bicycle speed S has fallen below the first downshift threshold D1 (VP), a downshift is not performed immediately, but rather downshifts are performed only when it is judged that one or all of a plurality of subsequently detected bicycle speeds S fall below the first downshift threshold D1 (VP) and are above the second downshift threshold D2 (VP). If it is judged that even only one of the detected bicycle speeds S has not fallen below the first downshift threshold D1 (VP), a downshift is not performed, and the current speed step is maintained. As a result, spurious downshifting operations are reduced even when the traveling condition is detected frequently.

FIG. 8 is a flowchart of a particular embodiment of an algorithm for manually operating the bicycle transmission (step S8 in FIG. 6). In manual shift mode (M), gear shifts are performed one gear at a time by pressing operating buttons 21 and 22. Initially, the operating position VP of the operating position sensor 26 is acquired in a step S41. In step S42, a judgment is made whether or not the operating button 21 has been pressed, and in step S43 a judgment is made whether or not the operating button 22 has been pressed. If the operating button 21 has been pressed, then the process moves from step S42 to step S44. In step S44, a judgment is made whether or not the bicycle transmission currently is in third gear. If not, then the process moves to step S45, wherein the operating position VP is incremented by one and the transmission is upshifted accordingly. Otherwise, this process is skipped. If the operating button 22 has been pressed, then the process moves from step S43 to step S46. In step S46, a judgment is made whether or not the bicycle is in first gear. If not, then processing moves to step S47, wherein the operating position VP is decremented by one and the transmission is downshifted accordingly. Otherwise, this process is skipped.

Figure 9A:
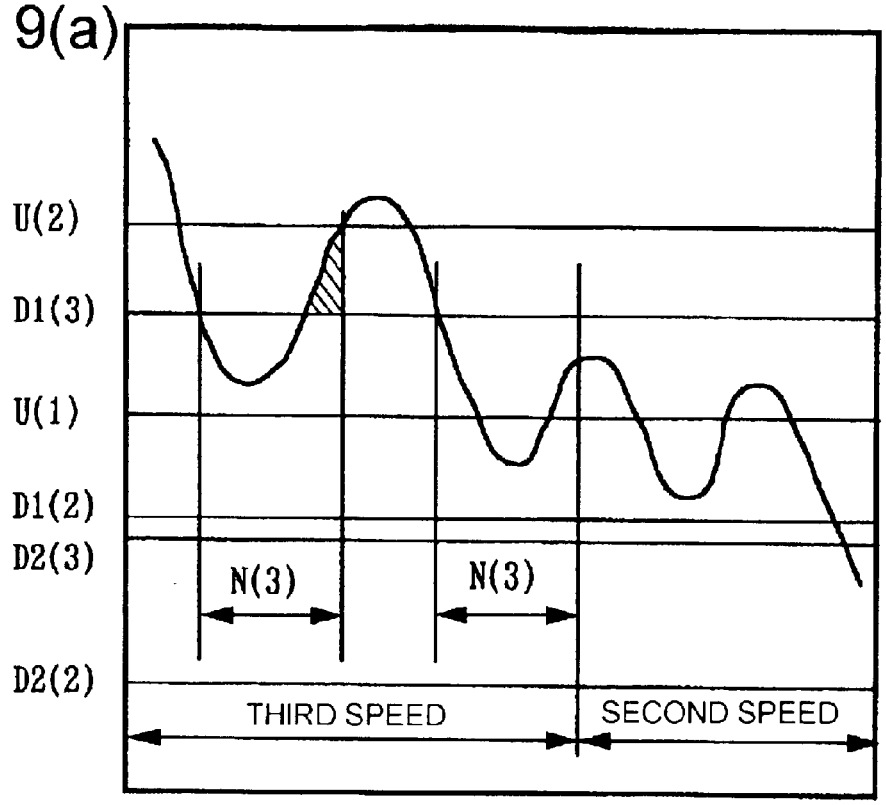
FIGS. 9(a) and 9(b) are graphs showing relationships between speed steps and wheel speed.
Figure 9B:
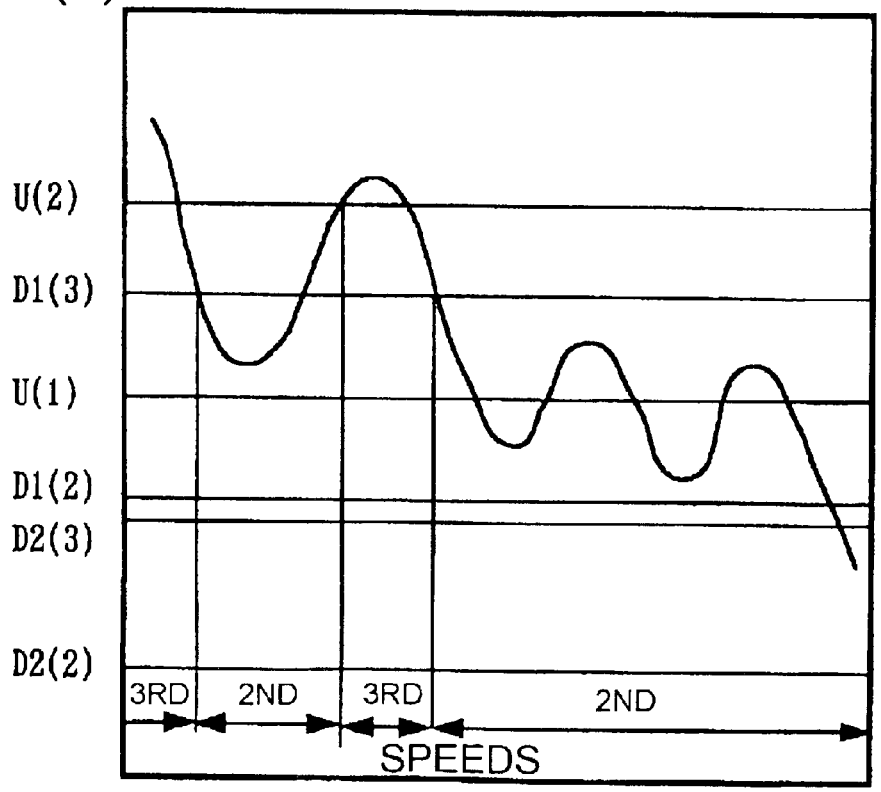

FIG. 9(a) is a graph showing the relationships between speed steps and wheel speed for an automatic shifting device as described above, and FIG. 9(b) is a graph showing the relationships between speed steps and wheel speed for a conventional automatic shifting device. In FIGS. 9(a) and 9(b), the vertical axis and the horizontal axis respectively show speed and time. In the automatic gear shift processing described above and shown in FIG. 9(a), when, for example, the bicycle speed S falls below the first downshift threshold in third gear D1 (3) (for example, 14.6 km/h), judgments are made in steps S16, S24 and S28 as to whether or not N (3) (e.g., 20) subsequent consecutive detection results have fallen below the first downshift threshold D1 (3). In the case of FIG. 9(a), the bicycle speed S does not fall below the first downshift threshold D1 (3) in the region shown by shading, and hence a "No" judgment is made in step S16 of FIG. 7. As a result, the downshift from the third speed step to the second speed step is cancelled, and no downshift is performed.

After the bicycle speed S has exceeded the upshift threshold U (2) and once again fallen below the first downshift threshold D1 (3), judgments are again made in steps S16, S24 and S28 whether or not N (3) subsequent consecutive detection results have fallen below the first downshift threshold D1 (3). This time, all N (3) detection results have fallen below the first downshift threshold D (3), so when the N (3) detections are complete, a downshift from the third speed step to the second speed step is executed.

In the conventional case, on the other hand, as is illustrated in FIG. 9(b), when the bicycle speed S falls below the first downshift threshold D1 (3), a downshift from the third speed step to the second speed step is performed immediately, and when the bicycle speed exceeds the upshift threshold U (2) (for example 16.4 km/h), an upshift back to the third speed step is performed immediately. Then, when the bicycle speed S again falls below the first downshift threshold D1 (3), a downshift to the second speed step is performed immediately. As a result, frequent shifts that are against the will of the rider are performed.

In the automatic control apparatus described above, whether or not downshifts are to be performed is decided by judging whether or not the bicycle speed S has fallen below the first downshift threshold D1 (VP) over a number of judgment times N (VP) for each speed step at the time of downshift. Thus, even if speed signals are acquired frequently, unwanted downshifts can be prevented. As a result, smooth gear shift operations can be realized, and the sense of discomfort felt during a gear shift operation can be reduced. As an additional benefit, even when the first downshift threshold D1 (VP) is exceeded, a downshift is not performed immediately, but rather the downshift threshold alters in accordance with the degree of speed reduction such that the actual downshift rate drops as the degree of speed reduction increases. Moreover, when the bicycle speed drops below the second downshift threshold D2 (VP) which is lower than the first downshift threshold D1 (VP), a gear shift is performed immediately without waiting for a plurality of detection results As a result, downshifts can be performed quickly when the speed has dropped due to rider fatigue, the ascent of a steep slope or the like. Thus, the load on the rider can be even further reduced.

Figure 10:
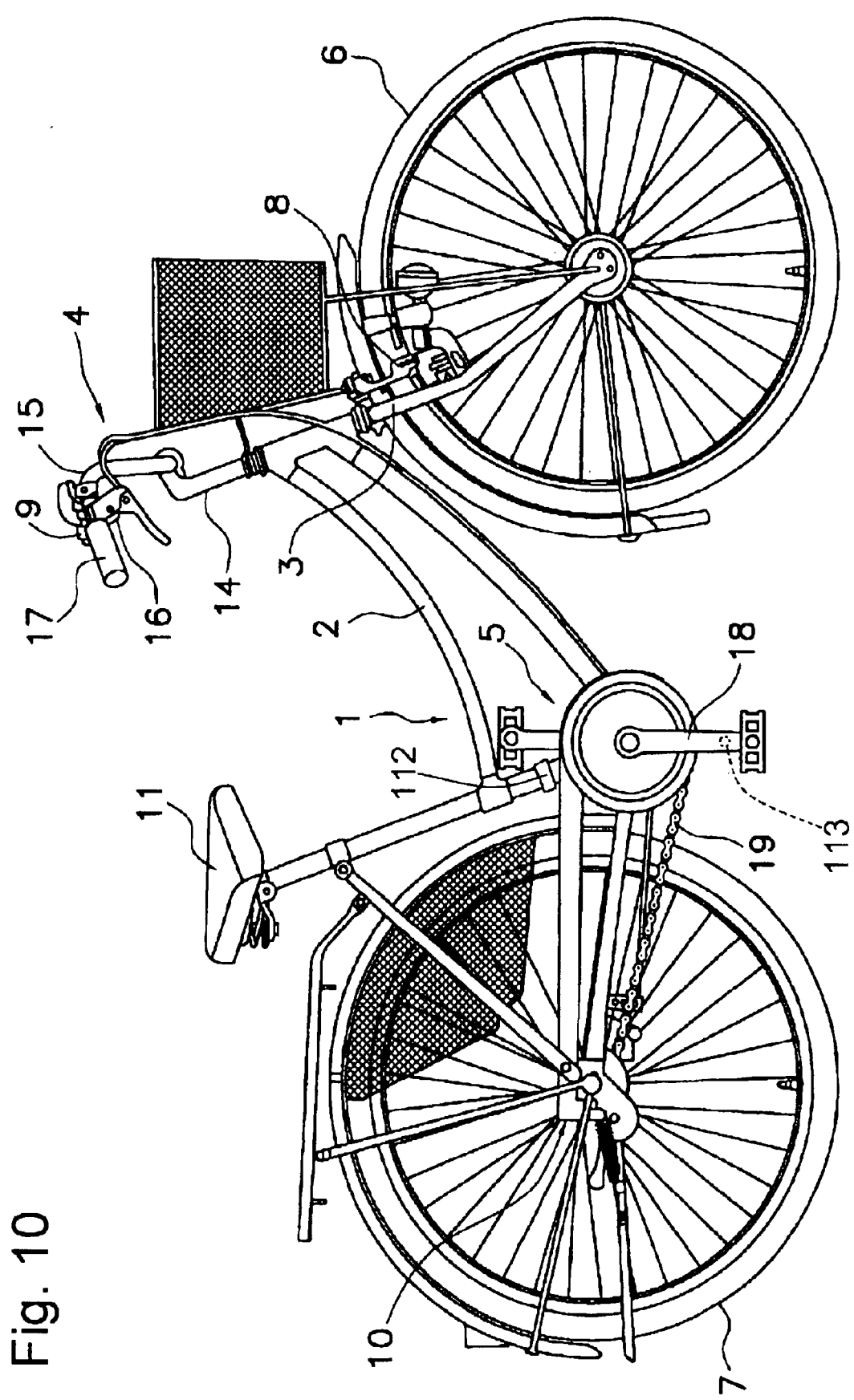
FIG. 10 is a side view of a bicycle that includes an alternative embodiment of an automatically controlled bicycle transmission.

In the above embodiment, bicycle speed was used as the traveling condition. However, the crank rotation speed also may also be used. In such a case, as is illustrated in FIG. 10, the crank rotation speed may be detected by attaching a detection element 113 such as a magnet to the gear crank 18 of the bicycle, and attaching a crank rotation detector 112 comprising a reed switch, for example, which detects the rotation of the detection element 113, to the frame body 2 of the bicycle. If desired, a large number of detection elements 113 and/or rotation detectors may be provided. As shown in FIG. 11, the upper limit and lower limit of the crank rotation speed may be set as thresholds in accordance with each speed step. In FIG. 11, the same value is set for each speed step, but these may be made to differ. In automatic gear shift mode, similarly to the operation shown in FIG. 7, control may be performed such that when the crank rotation speed falls below the first downshift threshold D1 (VP) (step S16) but does not fall below the second downshift threshold D2 (VP) (step S21), a judgment is made as to whether or not all of a plurality of consecutive subsequent detection results of the crank rotation speed fall below the first downshift threshold D1 (VP). When all of the detection results fall below the first downshift threshold D1 (VP), then a downshift is performed, whereas if even only one detection result does not fall below the first downshift threshold D1 (VP), the downshift is cancelled.

While the above is a description of embodiments of some inventive features, further inventive features may be employed without departing from the spirit and scope of the present invention. For example, the above embodiment used a three-speed internal gear changing hub 10 as an example of the gear shifting device. However, the number of speed steps and the form of the gear shifting device are not limited to these embodiments. For example, an external gear shift mechanism comprising a plurality of sprockets and a derailleur may be used as the gear shifting device. Also, the above embodiments employed a gear shifting device driven by a motor as an example. However, the gear shifting device may be driven by a solenoid; electric, hydraulic or pneumatic cylinders, and so on.

In the above embodiments, a second downshift threshold D2 (VP) is set such that when the bicycle speed S falls below the second downshift threshold D2 (VP), a downshift is performed immediately. However, downshift control may be performed without the use of the second downshift threshold D2 (VP).

In the above embodiments, upshifts are performed immediately after the upshift threshold has been exceeded. However, upshifts may be performed in a similar manner to downshifts, requiring a predetermined number of judgments. In this case, first and second upshift thresholds U1 (VP) and U2 (VP) may be used, as well as a first upshift threshold U1 (VP) alone. FIG. 12 shows an example of the respective thresholds in this case. As in the above embodiment, the upshift and downshift thresholds for each speed step are set with the crank rotation speed as the reference. The first and second upshift thresholds U1 and U2 are set at respective crank rotation speeds of 60 rpm and 75 rpm, whereas the first and second downshift thresholds D1 and D2 are set at respective crank rotation speeds of 42.5 rpm and 30 rpm. The first upshift threshold for the first speed step U1 (1) is 11.1 km/h, for example, and the first upshift threshold for the second speed step U1 (2) is 15.1 km/h, for example. The second upshift thresholds U2 for the first and second speed steps are 13.9 km/h and 18.9 km/h respectively, whereas the downshift thresholds are the same as in FIG. 4.

As in the above embodiments, an additional feature of this embodiment is that it may be desirable to determine whether or not the detected speed has exceeded the first upshift threshold for a prescribed time period to further guard against spurious operation. For example, it could be ascertained whether or not the detected speed exceeds the first upshift threshold U1 for at least a period of one half of one rotation of the crank 18. By making the judgment time longer than one half of one rotation of crank 18, gear shift control can be performed with consideration of the pulses caused by the speed variations of the crank 18. Thus, the pulses produced during one half of one rotation of the crank 18 have less of an effect on the shifting characteristics.

The periods of the crank rotation speed used in the setting of the first upshift threshold U1 in this embodiment, and the judgment times set in consideration thereof, are shown in FIG. 13. Here, the first upshift threshold U1 is set with 60 rotations as a reference, and since the period is a reciprocal of the rotation speed, the period of half of one rotation of the crank 18 is 0.50 seconds. In the case of the second downshift threshold D2, the period is 0.40 seconds. If the gear ratios of the internal gear changing hub 10 and the number of teeth on the front and rear sprockets are set to be the same as in the above embodiment, the speed increasing ratios of the crank rotation speed and the wheel rotation speed become 1.51, 2.06, and 2.81 in first speed, second speed and third speed respectively, as noted previously. Accordingly, since speed signals S are output from the generator hub 12 fourteen times per one rotation of the front wheel 6, judgments as to whether or not an upshift should be performed according to consecutive speed detection results are performed 11 times in first speed and 15 times in second speed in order to exceed a one half of one rotation of the crank 18. Since the minimum judgment time must exceed the pulsation period, and if the bicycle is traveling at a speed near the first upshift threshold U1, this minimum judgment time is taken 0.52 seconds in first speed, and 0.52 seconds in second speed.

Figure 14:
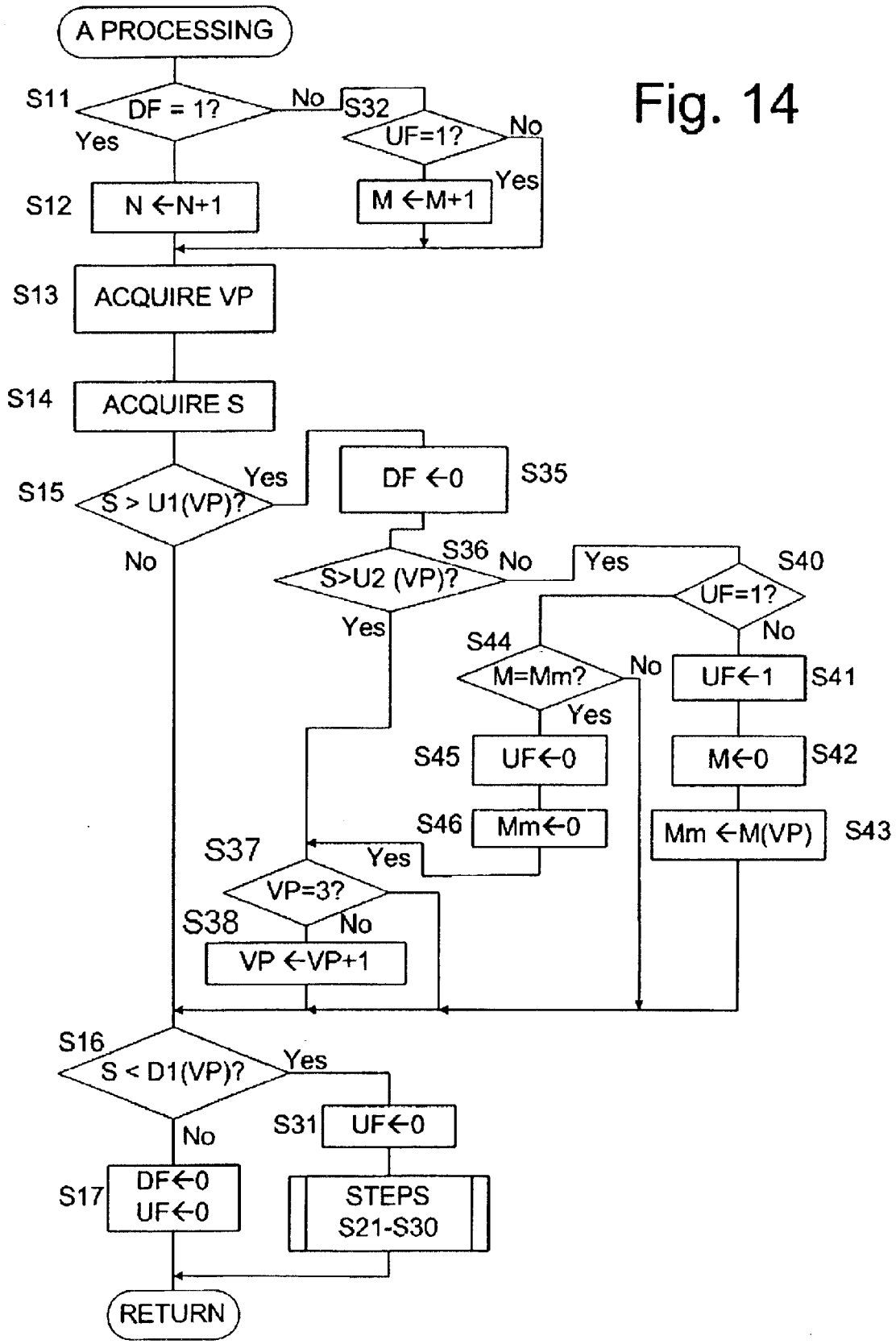
FIG. 14 is a flowchart of another algorithm for automatically operating the bicycle transmission.

FIG. 14 is a flowchart of a particular embodiment of an algorithm for automatically operating the bicycle transmission in this embodiment, which uses the first and second upshift thresholds U1 (VP) and U2 (VP) set in such a manner. In this embodiment, steps S11 through S30 are substantially identical to those in the embodiment shown in FIG. 7, and therefore explanation thereof has been omitted. Note that when it is judged in step S11 that the determining flag DF for a downshift is not set, then the process moves to S32. In step S32, a judgment is made whether or not a determining flag UF for an upshift is set. This determining flag UF is a flag similar to the determining flag DF for a downshift, and this flag is set in step S41 as discussed below. If the determining flag UF is already set, then a counting variable M displaying the number of speed detections for an upshift is increased by one in a step S33, and the processs moves to step S13. This determining flag UF and the counting variable M are used to determine the elapse of one half of one rotation of the crank 18 during an upshift in accordance with the first upshift threshold U1. If the determining flag UF is not set, then step S33 is skipped and the process moves to step S13.

In step S17, the determining flag UF is reset in addition to the determining flag DF. Additionally, if a judgment is made that the bicycle speed S detected in step S16 has fallen below the first downshift threshold D1 (VP), then the process moves to step S31, wherein the determining flag UF is reset in order to cancel any previous upshift judgment in accordance with the first upshift threshold U1 (VP).

If it is determined in step S15 that the current bicycle speed S is above the first upshift threshold U1 (VP) for the current speed step (e.g., if the bicycle speed S is above 15.1 km/h when in second gear (VP=2)), then the process moves from step S15 to step S35, wherein the determining flag DF is reset to cancel any previously downshift judgment in accordance with the first downshift threshold D1(VP). In step S36, a judgment is made whether or not the current bicycle speed S has exceeded the second upshift threshold U2 (VP) for the current speed step. In this embodiment, if the detected bicycle speed S exceeds the second upshift threshold U2 (VP), an upshift is performed immediately, regardless of any prior detection results. Thus, when the speed increases dramatically, an upshift is performed quickly such that the load on the rider can be lightened. Hence, if it ascertained in step S36 that the detected bicycle speed S exceeds the second upshift threshold U2 (VP), the process moves to step S37, and a judgment is made whether or not the bicycle is in third gear. If the bicycle is in third gear, then no further upshift processing is performed, and the process returns to the main routine. When the bicycle transmission is in second gear or below, then the moves to step S38 wherein the operating position VP is increased by one in order to shift up one speed step, after which the process returns to the main routine. At approximately the same time, motor 29 is operated so that the internal gear changing hub 10 shifts up one gear.

If it is determined in Step S36 that the detected bicycle speed S is slower than the second upshift threshold U2 (VP), then the process moves from step S36 to step S40. In step S40, a judgment is made whether or not the determining flag UF is already set. This judgment is made to determine whether or not this is the first time that the bicycle speed has been detected to be higher than the first upshift threshold U1(VP) and below the second upshift threshold. If the determining flag UF is not yet set (thus indicating that this is the first such detection), then the determining flag UF is set in step S41, the counting variable M is set to 0 in step S42, and the maximum count number Mm is set to the number of judgments M (VP) for the current speed step as shown in FIG. 13. A judgment already has been made in step S15, so Mm is actually loaded with the number of judgments shown in FIG. 13 minus one, for example 14 in second gear and 10 in first gear.

If it is determined in step S40 that the determining flag UF is set (i.e., if the detected bicycle speed S already has been detected at least once to be higher than the first upshift threshold U1(VP) and slower than the second upshift threshold U2(VP)), then the process moves from step S40 to step S44. In step S44, a judgment is made whether or not the count number M has reached the maximum count number Mm (i.e., whether or not the bicycle speed S has been detected to be higher than the first upshift threshold U1 (VP) and lower than the second upshift threshold U2 (VP) Mm number of times, which corresponds to one half of one rotation of the crank). If the count number M has not yet reached the maximum count number Mm, then the process returns to the main routine. If it is determined in step S44 that the count number M has reached the maximum count number Mm, then the determining flag UF is reset in step S45, the maximum count number Mm is set to zero in step S46, and the process moves to step S37. As noted above, in step S37 a judgment is made whether or not the bicycle is in third gear. If the bicycle is in third gear, no further upshift processing is performed, and the process returns to the main routine. When the bicycle is in second gear or below, then the process moves to step S38, wherein the operating position VP is increased by one in order to shift up one speed step, after which the process returns to the main routine. At approximately the same time, motor 29 is operated so that the internal gear changing hub 10 shifts up one gear.

In conclusion, when the detected bicycle speed S exceeds the first upshift threshold U1 (VP), an upshift is not performed immediately, but rather upshifts are performed only when it is judged that one or all of a plurality of subsequently detected bicycle speeds S exceed the first upshift threshold U1 (VP) and that the detected speed is below the second upshift threshold U2 (VP). If it is judged that even only one of the prescribed plurality of detection results has not exceeded the first upshift threshold U1 (VP), an upshift is not performed, and the current speed step is maintained. As a result, spurious upshifting operations are reduced even when the traveling condition is detected frequently.

Figure 15:
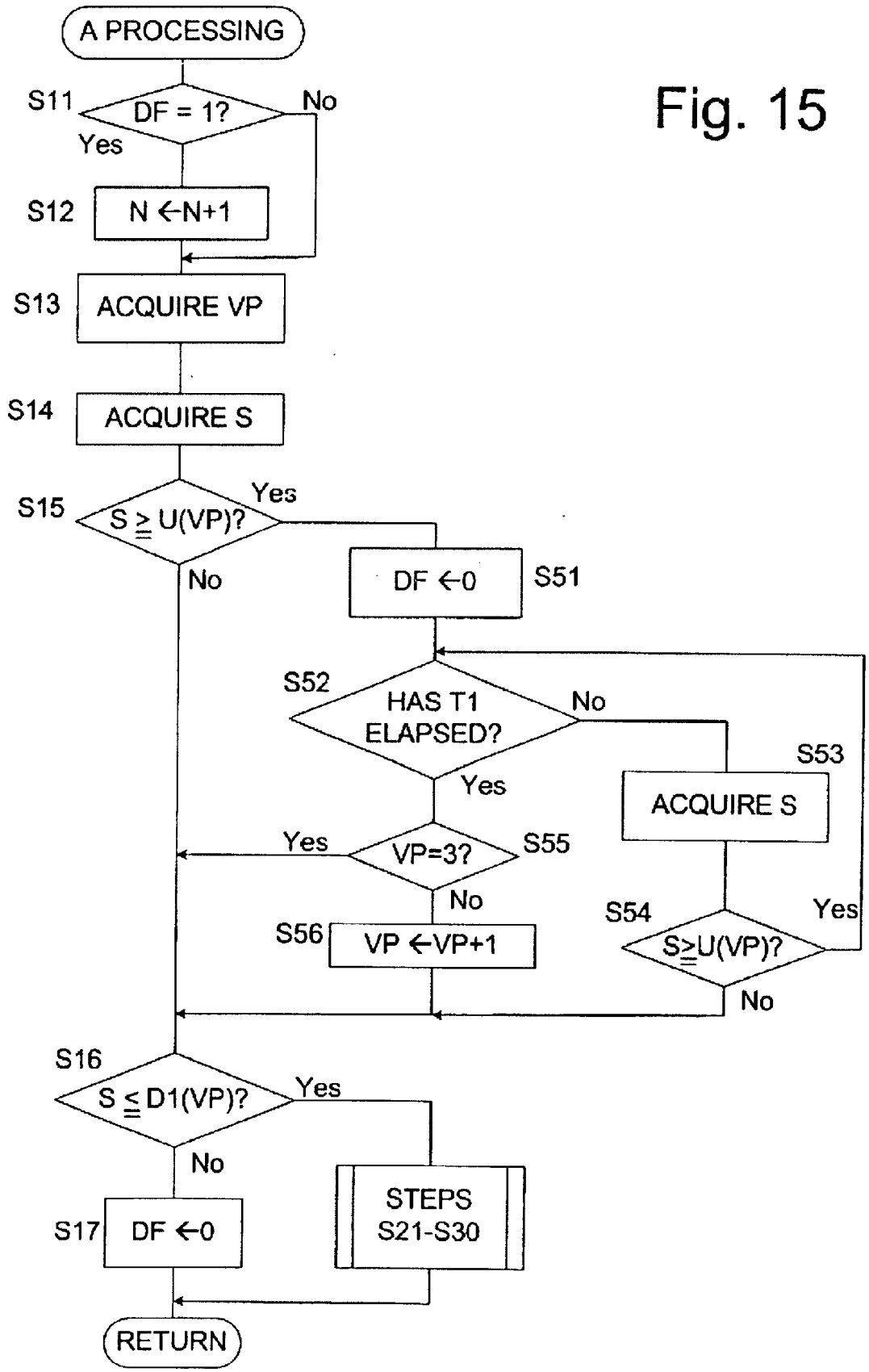
FIG. 15 is a flowchart of another algorithm for automatically operating the bicycle transmission.

Upshifts to speed steps with a larger gear ratio also may be performed using only one upshift threshold such that when the detected bicycle speed S exceeds the upshift threshold U, an upshift is not performed immediately, but rather is performed only when all of the detection results over a predetermined period of time exceed the upshift threshold, and is not performed when the bicycle speed S does not exceed the upshift threshold even only once during the elapse of the predetermined period of time. FIG. 15 is a flowchart of an algorithm for automatically operating the bicycle transmission in this embodiment. In FIG. 15, the operations of steps S11 through S17 and the operations from step S21 to step S30 are the same as those in FIG. 7, and hence explanation thereof has been omitted.

If a judgment is made in step S15 that the current bicycle speed S exceeds the upshift threshold U (VP) for the current speed step (e.g., if the bicycle speed S becomes faster than 16.4 km/h when in second speed (VP=2) in FIG. 4), then the process moves from step S15 to step S51, wherein the determining flag DF is reset in order to cancel any previous downshift judgment in accordance with the first downshift threshold D1 (VP). In step S52, a judgment is made whether or not a predetermined period of time T1 has elapsed since the judgment result in step S15. If not, then the process moves to step S53, and the bicycle speed S is acquired once more. In step S54, a judgment is made whether or not the re-acquired current bicycle speed S again exceeds the upshift threshold U (VP) of the current speed step. If the bicycle speed S does not exceed the upshift threshold U (VP), then the process moves to step S16. If the bicycle speed S again exceeds the upshift threshold U (VP), then the process returns to step S52, wherein another judgment is made whether or not the predetermined period of time T1 from the judgment result in step S15 has elapsed. When it is finally judged that the predetermined period of time T1 has elapsed, then the process moves from step S52 to step S55. In step S55, a judgment is made whether or not the bicycle is in third gear. If the bicycle is in third gear, then no further upshifts can be made, so the process moves to step S16. Note that the upshift threshold in third speed is 255 km/h, a speed which is inconceivable under normal circumstances, and therefore this routine would not normally be performed. When the bicycle transmission is in second gear or below, then the process moves to step S58, wherein the operating position VP is increased by one in order to shift up one speed step, after which the process returns to the main routine. At approximately the same time, motor 29 is operated so that the internal gear changing hub 10 shifts up one gear.

Whether or not to perform an upshift is determined in this embodiment based on the judgment whether or not the upshift threshold U (VP) is exceeded during the elapse of the predetermined amount of time T1 at the time of an upshift. Thus, once again upshifts which are against the will of the rider can be prevented even when speed signals are acquired frequently. As a result, smooth gear shift operations can be realized, and the sense of discomfort felt during a gear shift operation can be reduced.

Figure 16:
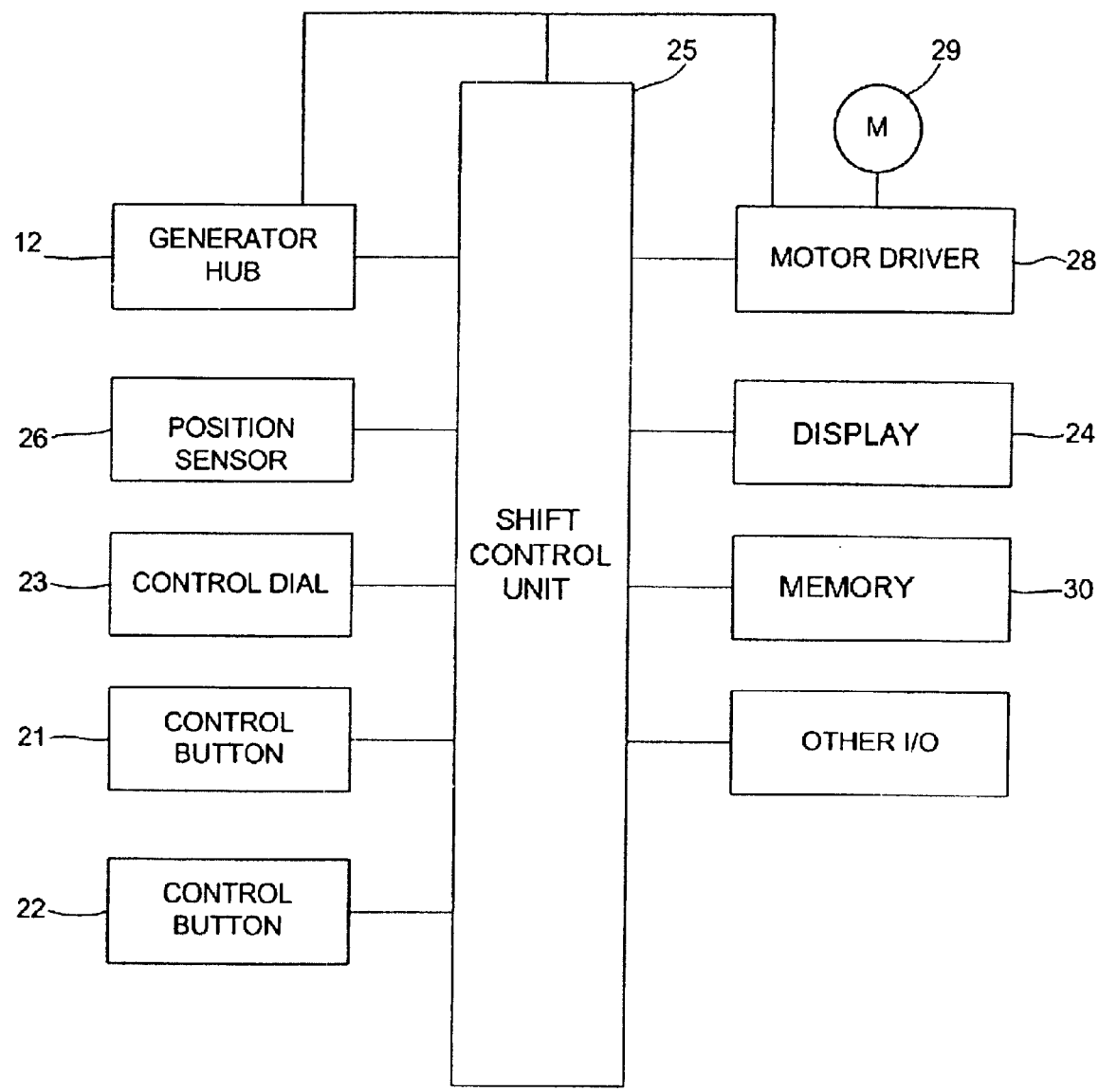
FIG. 16 is a block diagram of another embodiment of a shift control device.

In the first embodiment, electric power from the power source 27 is used as the power source for motor 29 and the gear shift control section 25. However, as is shown in FIG. 16, electric power supplied from the generator hub 12 also may be used as a power supply.

The flowcharts showing implementation procedures, thresholds and so on in each of the aforementioned embodiments are nothing more than examples thereof, and other algorithms and other thresholds may be used as means for implementing the present invention.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A control device for a bicycle having a transmission with a plurality of speed steps, wherein the control device comprises:
   a traveling condition signal receiver that receives traveling condition signals corresponding to a traveling condition value of the bicycle;
   wherein the traveling condition signal corresponds to an alternating current generator signal adapted to provide operating power to electrical components mounted to the bicycle, wherein the traveling condition signal has a frequency derived from a frequency of the alternating current generator signal so that a plurality of traveling condition values are produced for each revolution of a bicycle wheel;
   a threshold value memory that stores a first threshold value of the traveling condition; and
   a processor that compares a combination of a plurality of the traveling condition values to the first threshold value and provides a first control signal for shifting the bicycle transmission when the combination of the plurality of traveling condition values pass the first threshold value to reduce the generation of the first control signal in response to fluctuations in frequency of the alternating current generator signal.

2. The control device according to claim 1 wherein the traveling condition signal corresponds to bicycle speed.

3. The control device according to claim 2 wherein the traveling condition signal corresponds to an alternating current generator signal generated by a generator hub.

4. The control device according to claim 1 wherein the first control signal comprises a signal for downshifting the bicycle transmission.

5. The control device according to claim 1 wherein the first control signal comprises a signal for upshifting the bicycle transmission.

6. The control device according to claim 1 wherein the threshold value memory stores a second threshold value of the traveling condition, and wherein the processor provides the first control signal when at least one of the traveling condition values pass the second threshold value.

7. The control device according to claim 6 wherein the processor provides the first control signal only if at least one of the plurality of traveling condition values pass the first threshold value for a prescribed time interval.

8. The control device according to claim 7 wherein the processor provides the first control signal only if each of the plurality of traveling condition values pass the first threshold value for the prescribed time interval.

9. The control device according to claim 1 wherein the processor provides the first control signal when the traveling condition values corresponding to at least two consecutively received traveling condition signals pass the first threshold value.

10. The control device according to claim 9 wherein the threshold value memory stores a second threshold value of the traveling condition, and wherein the processor provides the first control signal when at least one of the traveling condition values pass the second threshold value.

11. The control device according to claim 10 wherein the first control signal corresponds to a control signal for downshifting the bicycle transmission, and wherein the processor provides the first control signal when the traveling condition values fall below the first threshold value.

12. The control device according to claim 11 wherein the threshold value memory stores a third threshold value of the traveling condition, and wherein the processor provides a second control signal for upshifiing the bicycle transmission when at least one of the traveling condition values exceed the third threshold value.

13. The control device according to claim 12 wherein the processor provides the second control signal only if at least one of the plurality of traveling condition values exceed the third threshold value for a prescribed time interval.

14. The control device according to claim 13 wherein the processor provides the second control signal only if each of the plurality of traveling condition values exceed the third threshold value for the prescribed time interval.

15. The control device according to claim 1 wherein further comprising a motor driver for operating the bicycle transmission, and wherein the processor operates the motor driver.

16. The control device according to claim 15 wherein the motor driver operates from alternating current from a generator.

17. The control device according to claim 15 wherein the motor driver operates from electrical power from a battery.

18. The control device according to claim 1 wherein at least 14 traveling condition values are received per wheel revolution.

19. A control device for a bicycle having a transmission with a plurality of speed steps, wherein the control device comprises:
   a traveling condition signal receiver that receives traveling condition signals corresponding to a traveling condition value of the bicycle;

a threshold value memory that stores a first threshold value of the traveling condition;

wherein the threshold value memory stores a second threshold value of the traveling condition;

wherein the threshold value memory stores a third threshold value of the traveling condition;

a processor that compares a plurality of the traveling condition values to the first threshold value and provides a first control signal for downshifting the bicycle transmission when the traveling condition values corresponding to at least two consecutively received traveling condition signals fall below the first threshold value;

wherein the processor provides the first control signal when at least one of the traveling condition values fall below the second threshold value;

wherein the processor provides a second control signal for upshifting the bicycle transmission when at least one of the traveling condition values exceed the third threshold value; and wherein the processor provides the second control signal when a plurality of the traveling condition values exceed the third threshold value.

20. The control device according to claim 19 wherein the processor provides the second control signal when the traveling condition values corresponding to at least two consecutively received traveling condition signals exceed the third threshold value.

21. The control device according to claim 20 wherein the threshold value memory stores a fourth threshold value of the traveling condition, and wherein the processor provides the second control signal when at least one of the traveling condition values exceed the fourth threshold value.

* * * * *